United States Patent [19]

Ebert

[11] 4,052,593
[45] Oct. 4, 1977

[54] ELECTRIC HEATING APPARATUS FOR HEATING THERMOPLASTIC ARTICLES

[76] Inventor: Edward A. Ebert, 203 Huxley Drive, Snyder, N.Y. 14226

[21] Appl. No.: 589,200

[22] Filed: June 23, 1975

[51] Int. Cl.² .......................... H05B 1/00; G02B 5/10
[52] U.S. Cl. ........................................ 219/521; 81/3.5; 219/343; 219/349; 219/354; 219/358; 219/364; 219/377; 219/405; 219/411; 350/292; 362/218; 362/301
[58] Field of Search .................... 219/347-349, 219/342, 354, 346, 343, 400, 411, 405, 385, 386, 377, 521, 531; 99/401; 240/103 R, 41.35 C, 47; 81/3.5; 350/285, 288, 290, 292, 293, 294, 296, 299

[56] References Cited
U.S. PATENT DOCUMENTS

| | | | |
|---|---|---|---|
| 1,587,023 | 6/1926 | Mottlau | 219/349 UX |
| 2,134,474 | 10/1938 | Gillespie | 219/405 X |
| 2,368,026 | 1/1945 | Jepson | 219/349 UX |
| 2,710,331 | 6/1955 | Stegeman | 219/349 UX |
| 3,037,443 | 6/1962 | Newkirk et al. | 219/411 X |
| 3,114,822 | 12/1963 | Boland | 219/405 X |
| 3,147,363 | 9/1964 | Mohn et al. | 219/349 X |
| 3,152,243 | 10/1964 | Andrews | 219/405 |
| 3,329,801 | 7/1967 | Shannon et al. | 219/405 X |
| 3,334,620 | 8/1967 | De Werth | 99/401 UX |
| 3,515,853 | 6/1970 | McAdams | 219/411 X |
| 3,559,564 | 2/1971 | Turner et al. | 219/411 X |
| 3,732,803 | 5/1973 | Buxmann | 219/354 UX |
| 3,816,705 | 6/1974 | Ebert | 219/354 X |

Primary Examiner—A. Bartis

[57] ABSTRACT

A device for electrically heating thermoplastic articles includes a housing having means for receiving the article in position to be heated. An infrared generator in the form of a tungsten halogen lamp is located in the housing and a split, out-of-phase parabolic reflector system is provided for directing the radiation from the lamp onto plural sides of the article. A blower in the housing provides a flow of cooling air over the lamp and reflector system. A thermal control means responsive to the combination of radiant heat absorbed from the lamp and the cooling effect of the flow of air is provided for cycling the lamp on and off to control the radiant energy emitted therefrom. The lamp may be surrounded by a foraminous thermal converter which allows some of the direct radiation from the lamp to filter through to be directed to the article and interrupts and absorbs the remainder of the radiation converting it to heat which is picked up by the air flow for delivery to the article being heated.

16 Claims, 28 Drawing Figures

ELECTRIC HEATING APPARATUS FOR HEATING THERMOPLASTIC ARTICLES

BACKGROUND OF THE INVENTION

This invention relates to an improved method and apparatus for heating a thermoplastic article to a temperature at which it begins to soften so that it may be subsequently manipulated by a technician into a desired shape, and, more particularly, it is directed to the shaping of thermoplastic eyeglass frames.

By way of background, in the past many types of devices were used to heat eyeglass frames by conduction, convection and radiant heat. However, all of the foregoing had certain deficiencies. In those devices which utilized conduction to transfer heat to the frames from heated glass beads or salts, undesirable dimples and residue were formed on the frames. In commercial devices which used convection, such as disclosed in my U.S. Pat. No. 2,789,200, issued Apr. 16, 1957, the heat transfer by heated forced air took an undesirably long time. Prior devices which used radiant heat produced by high temperature radiators were very difficult to use and control because there were many variables which had to be considered including (1) the color of the thermoplastic being treated which affected the absorption of energy from the radiator, and (2) the critical positioning of the article relative to the radiator. To overcome the difficulties attendant to the use of radiant energy, my U.S. Pat. No. 3,816,705, issued June 11, 1974, was developed using far infrared to permit effective control of radiant infrared radiation relative to the article being treated. Furthermore, in all of the above prior types of devices heating means such as electrical resistance elements were used to heat something else, such as the air in convection heaters, or the cast aluminum as used in radiation heaters. This type of indirect heating produced an inertial heat lag and thus there was an undesirable time delay before the devices were capable of producing the required temperature. It is with overcoming the foregoing deficiencies of prior types of thermoplastic heating devices that the present invention is concerned.

By way of further background, infrared radiation travels at the speed of light in straight lines out from a source, and this radiation can be controlled and directed by optical systems, reflectors and prisms in the same manner as visible light. The wave length of the radiation varies inversely with the temperature of the radiation source, that is, the higher the temperature of the radiation source, the shorter will be the wave length, and vice versa. Furthermore, many materials are transparent to the shorter wave lengths. Hence, the heating of an article with the longer rays which are effective in heating the surface and with the shorter rays which are effective in penetrating into the interior of the article will decrease the amount of time necessary to bring such article up to an elevated temperature. In addition, if the article is also exposed to a flow of hot air, the heating time will be still further reduced. By cycling tungsten halogen lamps, or other radiation generators, on and off the generation of energy output can be varied and can be closely controlled. In addition, the cycling produces both long wave and shortwave radiation because, as noted above, the wave length varies with the temperature of the source.

It is an important object of the present invention to provide a heater which not only heats thermoplastic articles to bending temperature rapidly, but which can also be brought to operating temperature almost instantaneously, and which can produce a closely controlled temperature.

It is another important object of the present invention to provide a heater for thermoplastic articles with the capability of heating a thermoplastic article with both long and short wavelength infrared rays. A related object is to effect the foregoing and also simultaneously provide a bath of heated air to the article to thereby uniformly bring the article to the desired temperature rapidly.

Another important object of the present invention is to use as a heat generator for heating thermoplastic articles a tungsten halogen lamp or its equivalent, which has a very small inertial heat lag. A related object is to subject the tungsten lamp to a pulsating electric current varying from approximately zero voltage to maximum at intervals to cause said lamp to radiate infrared rays in both the long and short wave lengths to produce near and far infrared, to thereby produce rapid and thorough heating of the article.

Another object of the present invention is to control the energy received by the article being treated by cycling a radiant energy emitting lamp on and off to vary the energy output therefrom.

A further object of the present invention is to utilize a portion of radiation from the heating source to actuate an interrupter control which produces the intermittent pulsations to thereby regulate the energy output. A related object is to use the interrupter in an air cooling system and vary its exposure to infrared radiation from the heat generator while simultaneously varying its exposure to the cooling air so as to control and vary the on and off periods of the interrupter and thus further regulate energy output.

Yet another object of the present invention is to provide an unique energy guide system for directing the radiation from a source to opposite sides of the article being treated in such a manner that there are no unequal concentrations of radiation which might deleteriously affect the article.

A further object of the present invention is to provide a device for heating thermoplastic articles which includes a thermal converter surrounding the source of radiant energy whereby the radiant energy is transformed into heat, whereby air flowing around the generator and through the converter may be heated and then directed to the article to be heated.

A still further object of the present invention is to provide an improved heat responsive switch assembly capable of responding rapidly to radiant heat and which is also capable of providing different lengths of cycles of operation by varying the amount of exposure to radiant energy which the switch receives.

SUMMARY OF THE INVENTION

The present invention relates to a device for heating a thermoplastic article comprising a housing, article receiving means positioned relative to said housing for receiving said article, lamp means in said housing providing a source of heating energy, and guide means in said housing for conducting said heating energy to said article receiving means. In its more specific aspect the lamp means comprises a single lamp positioned relative to the article receiving means so that the guide means direct radiant energy from said single lamp to a plurality of sides of said article. In a still more specific aspect of the present invention, control means are provided for cycling said lamp means on and off to control the radiant energy emitted therefrom while also producing near and far infrared radiation because the temperature of the lamp varies due to the cycling.

The present invention also relates to an improved method for heating a thermoplastic article comprising the steps of providing a radiant heat generator, positioning the article relative to the radiant heat generator, and cycling the radiant heat generator to control its output of energy and produce both longer and shorter infrared wave lengths for heating said article.

The present invention also relates to an improved heat responsive switch comprising a housing, a heat responsive member mounted in tension on said housing, means for permitting exposure of said heat responsive member to radiant energy, switch means on said housing, linkage means operatively coupling said heat responsive member and said switch means to effect opening and closing of said switch means in response to expansion and contraction of said heat responsive member, and means for varying the exposure of said heat responsive member to said radiant energy.

BRIEF DESCRIPTION OF THE DRAWINGS

The present invention, as well as further objects and features thereof, will be understood more clearly and fully from the following detailed description of the preferred embodiments, when read in conjunction with the accompanying drawings, in which.

GENERAL OPERATION

An overall composite housing of enclosure 25 is provided which is comprised of four mating closures 26, 27, 28 and 29. The first closures 26 and 27 meet face to face to form a central unit generally indicated as 30. This central unit 30 has in its front end, i.e., the left side of FIGS. 1, 2, 3, 4 and 5, an open ended channel 35 as more clearly seen in FIG. 2 wherein a thermoplastic article, such as an eyeglass frame, may be held by an operator.

At its top side a louvered nozzle 50 is located which directs cooling air away from the operator but is readily available for cooling the heated article. At its rear, i.e., the right side in FIGS. 1, 2, 3, 4 and 5, a compartment 55 is provided for containment of a fan motor 62.

Figure 1:
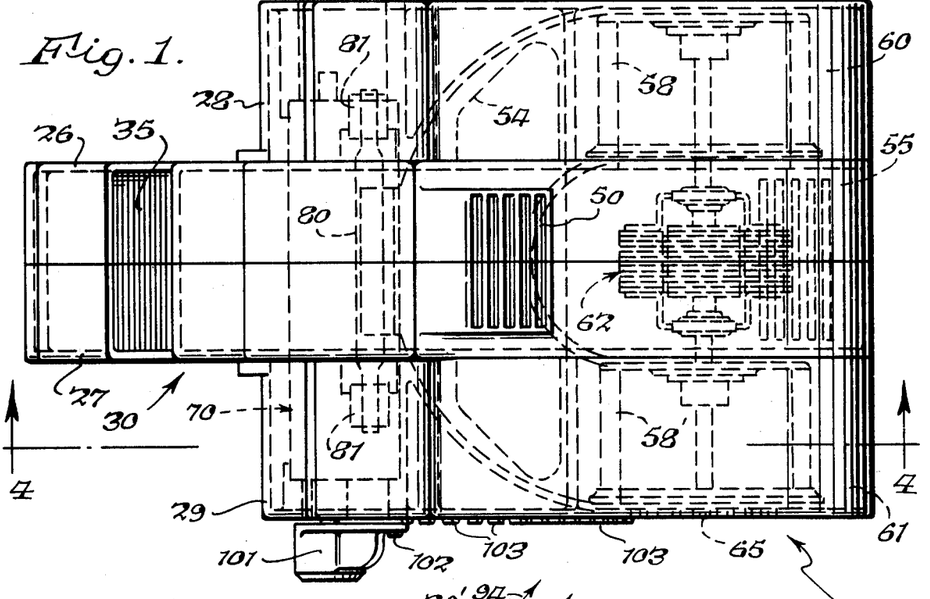
FIG. 1 is a top plan view of the improved article heater of the present invention.
Figure 2:
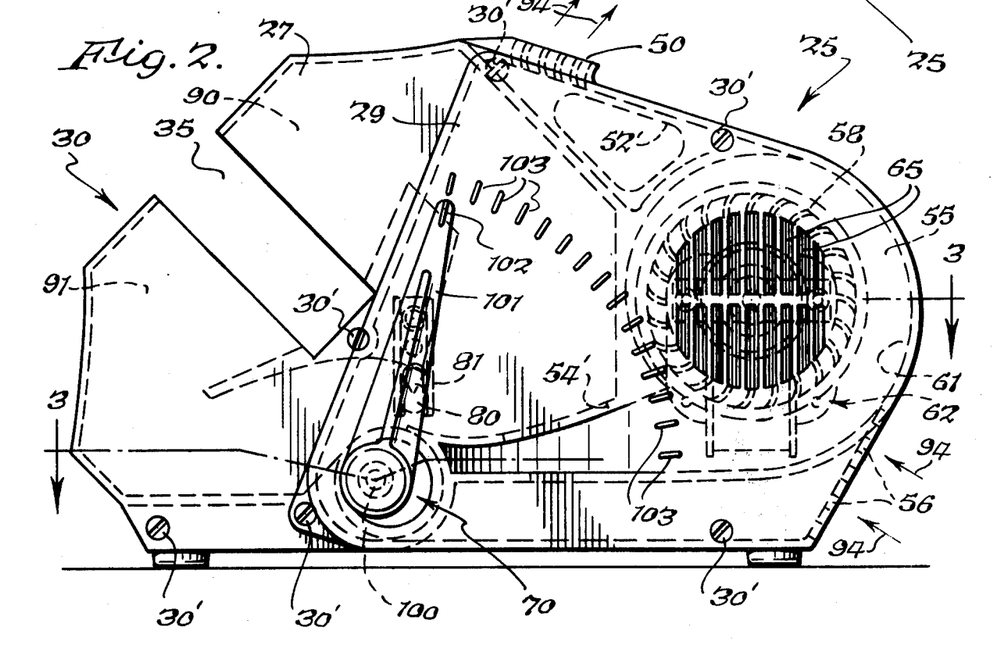
FIG. 2 is a side elevation of FIG. 1.
Figure 3:
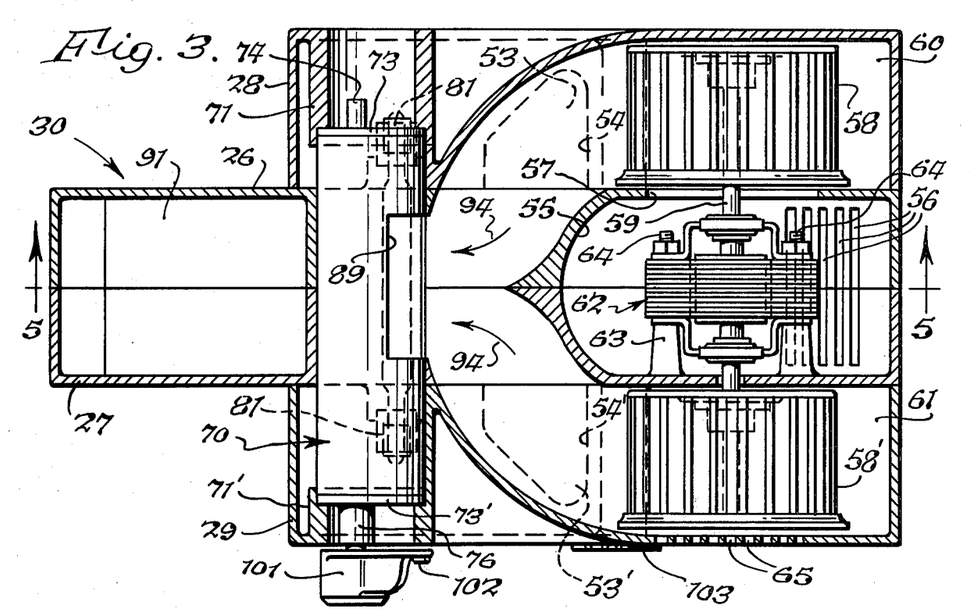
FIG. 3 is a horizontal sectional view taken along line 3—3 of FIG. 2, showing forced air motivating means.
Figure 5:
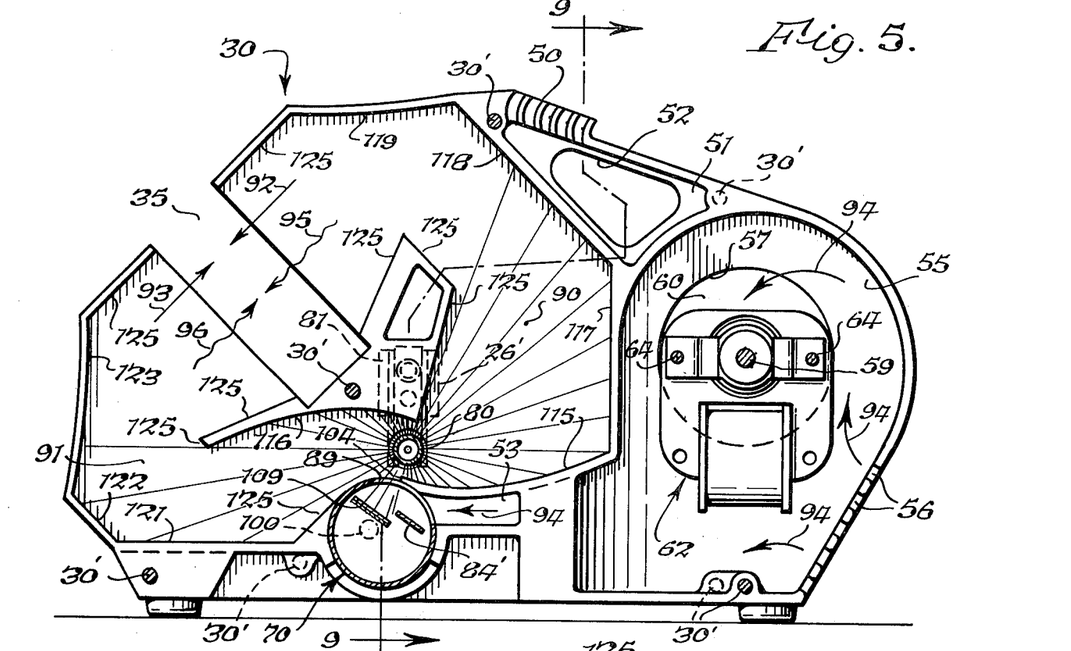
FIG. 5 is another vertical section taken along line 5—5 of FIG. 3, showing the energy reflector system used in conjunction with a forced air and interrupter system used in this form of the invention.

The second closures 28 and 29 mate against the first closures 26 and 27, the second closure 28 against first closure 26 and the second closure 29 against first closure 27. As seen in FIGS. 1, 3 and 5 these second closures 28 and 29 are formed to provide blower housings 60 and 61 and ductwork for conducting air from these housings to the cooling jet nozzle 50 and also to the infrared ray generator 80 and the control device indicated at 70. The infrared generator 80 is clearly shown in FIGS. 5, 6, 7 and 8 and is located above the control device 70.

Control device 70 is in communication with the focal center of an energy guide system 90, 91 where generator 80 is located. This system 90, 91 delivers the radiation in opposite directions from the generator 80 to meet in channel 35 as shown by arrows 92, 93 in FIG. 5. At the same time cooling air traveling in the direction of arrows 94 (FIG. 6) having served its purpose in cooling the generator 80 is delivered, now heated, to channel 35, as indicated by arrows 95 and 96 in FIG. 5. Thus, if a thermoplastic article is held in the channel 35 for heating, it is exposed on at least its opposite sides to the infrared radiation as shown by arrows 92, 93 as well as the transient heated air as shown by arrows 95 and 96.

The air depicted by arrow 94 (FIG. 6), which cools the control 70 and generator 80, is supplied by the blower wheels 58, 58' (FIG. 3) at above ambient air pressure and it is also conducted through the housing to the nozzle 50 for cooling the heated article to a rigid condition.

In the modified embodiment of the invention shown in FIGS. 16-22, the guide system may be the same as that shown in FIGS. 1-15 or it may be altered to a more compact version. Here most of the infrared radiation is changed by a thermal converter 210 into hot air. The thermal converter 210 surrounds the generator 80 and is made impervious to any desired degree to the infrared rays while it remains permeable to the flow of air 94, thereby heating it through convection while passing through the converter and out into the channel 35' to heat an article through convection. The guide system 225, 226 in this case will direct two streams of heated air depicted by arrows 227, 228 and the infrared radiation which gets through the converter 210 to the article in the channel 35' onto two of its sides.

DETAILED DESCRIPTION

The housing 25 may be molded or fabricated of cast aluminum or a suitable high-temperature plastic. By forming the four mating first and second closures 26, 27, 28, 29 with three parting lines, i.e., at the centerline and along the outside of each first closure 26 and 27, all of the construction requirements can be met. Screws 30' may be used to hold all of the closures in proper relationship to each other. Removal of the screws permits disassembly of the housing 25 for ease of servicing.

As may be seen in FIGS. 3 and 5 at the right a motor compartment 55 is formed which also has an air intake grid 56 and an inlet 57 for the blower housing 60 which contains the blower wheel 58 mounted on motor shaft 59 of the motor 62 which is itself mounted on bosses 63 which project from closure 27 by bolts 64.

Figure 4:
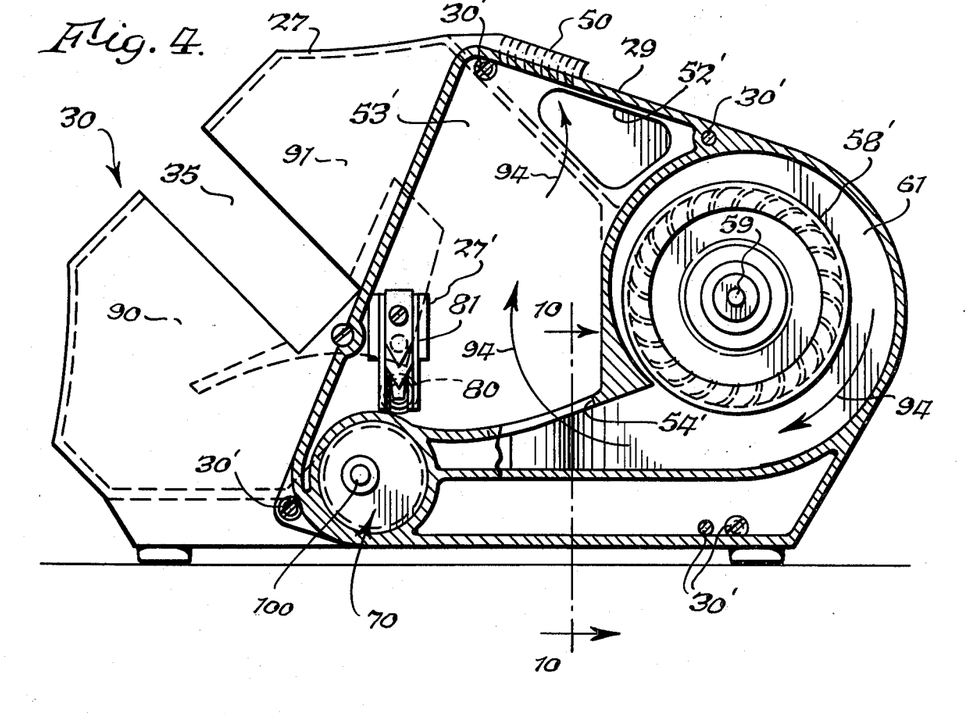
FIG. 4 is a vertical section taken along line 4—4 of FIG. 1 showing some air flow paths.
Figure 9:
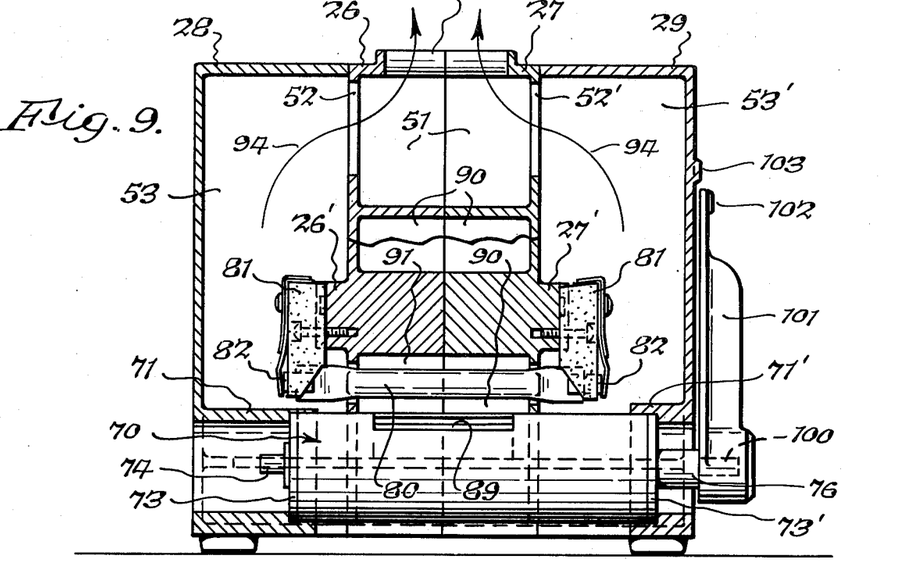
FIG. 9 is a vertical section across the machine along line 9—9 of FIG. 5, showing the air passage to the cooling jet outlet, the radiation generator and the interrupter control mounting.
Figure 10:
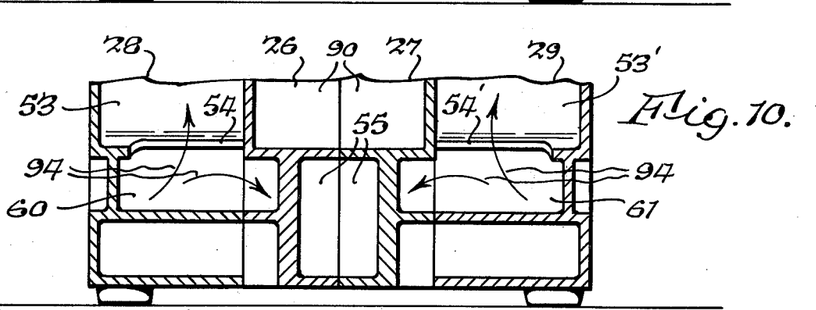
FIG. 10 is a fragmentary vertical cross section along line 10—10 of FIG. 4, showing detail of air passages at that line.

The motor 62 has another blower wheel 58' in a housing 61 on the other end of its shaft 59. Air is provided through an intake 65 in the side wall of closure 29 for blower wheel 58'. As shown in FIG. 3, wheels 58, 58' and associated ducts cause air to flow into a window 89 of a control device 70 from which it flows into guide system 90, 91. Air also flows from chambers 60, 61 up through the openings 54, 54' into air chambers 53, 53' (FIGS. 4, 9 and 10). The air from chambers 53, 53' then passes through openings 52 and 52' in the side walls of closures 26, 27 into a compartment 51 and thence to the louvered port or nozzle 50, as depicted by arrows 94.

Since the motor 62 drives a first and second blower wheel 58 and 58', the two together in parallel provide the volume of air being supplied to the air chambers 53, 53' and then to nozzle 50. If found desirable, with this set up it would be easy to use the one air supply for the air jet 50 while the other could be a separate air supply for cooling the infrared generator 80 and control 70. Also instead of in parallel effort they could easily be set up in series action so as to provide a two-stage higher pressure system.

To the left in FIGS. 3 and 5 is mounted the control 70 and the infrared generator 80. As will be seen in greater detail in FIGS. 6, 7, 8, 9, 10 and 11, the generator 80 is a tungsten halogen lamp which is a most efficient high temperature radiant heat source. A lamp of this type is very compact in size and has high heat capability coupled with long life. Lamps of this type are manufactured by Sylvania Corp. and General Electric Co., Lamp Division. However, other types of lamps can be used within the contemplation of the present invention, provided that they provide a proper amount of radiation to produce satisfactory heating. Direct radiant heat from the lamps to the article to be heated provides high efficiency because no heat is wasted in heating an intermediate agent, as in the convection or conduction means previously mentioned.

Mounted on alignment bosses 26' and 27' (FIGS. 4, 9 and 11) are porcelain sockets 81 which hold the lamp 80 in a precise focal position while providing good electrical connection with the lamp and its contacts 82. The sockets 81 mounted on the bosses 26', 27' are located in the air chambers 53, 53' where cooling air depicted by arrows 94 circulates to cool these sockets, the lamp contacts and the ends of generator 80. Openings 52- and 52''' in the walls of closures 26, 27 are provided larger than the lamp diameter so that cooling air will flow into the guide system 90, 91 from chambers 53, 53' to further cool the ends.

The high intensity tubular infrared lamp 80 provides extremely fast response with very little inertial thermal lag, reaching approximately 85% of its heat output within 5 seconds and losing 80% of its heat output within another 5 seconds. In addition because the infrared radiation produced by lamp 80 travels at the speed of light and produces a total high energy output because of the extremely high source temperature of 2960° K, extremely fast heating of articles can be accomplished. The foregoing characteristics of lamp 80 require a very fast and sensitive control device to prevent ruination of the article being heated.

Figure 11:
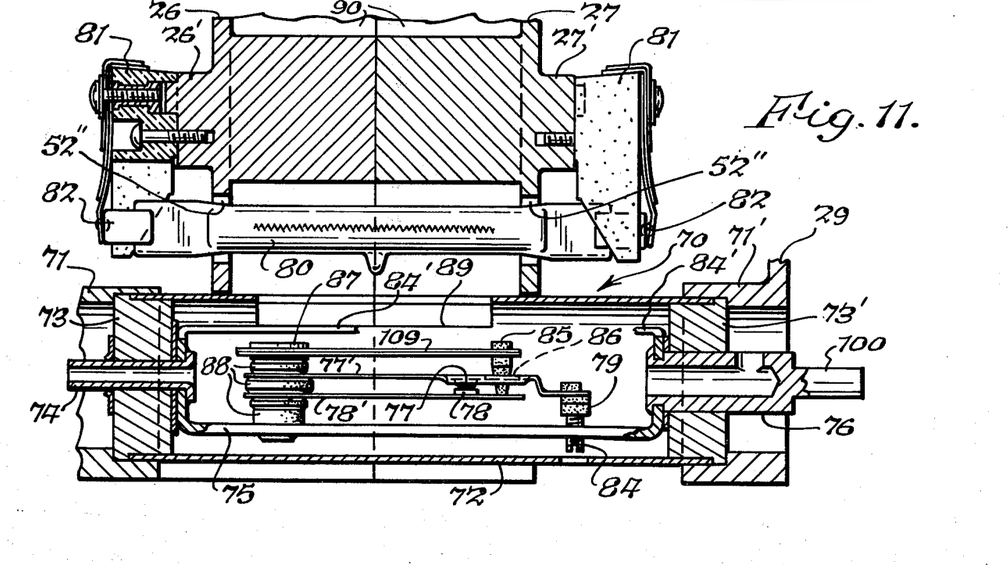
FIG. 11 is a fragmentary enlargement of the lower portion of FIG. 9 with the interrupter also shown in section and in full detail.

Just below lamp 80 is mounted the control device 70 which is held in sockets 71, 71' extending from the second closures 28, 29 (FIGS. 9 and 11). Control 70 comprises a tube 72 closed at each end with bearing hubs 73, 73'. From FIG. 11 it can be seen that the left bearing hub 73 pivotally carries a tubular shaft 74 which rotatably bears a frame member 75, which projects to the right where it ends in another larger hollow shaft 76 also rotatably borne in the hub 73'. These shafts are hollow to provide access for the electrical lead wires which are required, but not shown.

Mounted on the frame member 75 are a pair of spring fingers 77', 78' which are insulated from each other by insulators 88 at one end and carry contact members 77, 78, respectively, at their other ends. Finger 77' has an extension which carries a porcelain insulator abutment 79. Bearing against this abutment is an adjusting screw 84 which is threaded into the frame member 75. The purpose of the screw 84 is for callibration of the control contacts 77, 78. Also mounted on the frame member 75 is a thermal radiation sensing part 109 carrying a porcelain tappet 85 which reaches through an opening 86 in the finger 77' down to the other finger 78', which when deflected downwardly opens the contacts 77, 78 to break the electrical connection between them. All of the parts 77', 78' and 79 are mounted by a stud 87 and insulators 88 to the frame member 75, the stud being swaged at frame 75.

Looking at FIGS. 5, 6, 7, 8 and 11, an air deflector 84', which is an elongated blade-like member fixed to opposite ends of frame member 75, is shown and its purpose will later be disclosed. A window opening 89 in tube 72 permits projection of infrared radiation from the lamp generator 80 onto the radiant sensing part 109 for its response to any infrared being generated. A reduced shank 100 at the end of shaft 76 carries a regulator arm 101 having a pointer 102 (FIGS. 2 and 9) arranged to be set opposite any number of calibrated indicator markings 103.

Figures 6, 7, 8:
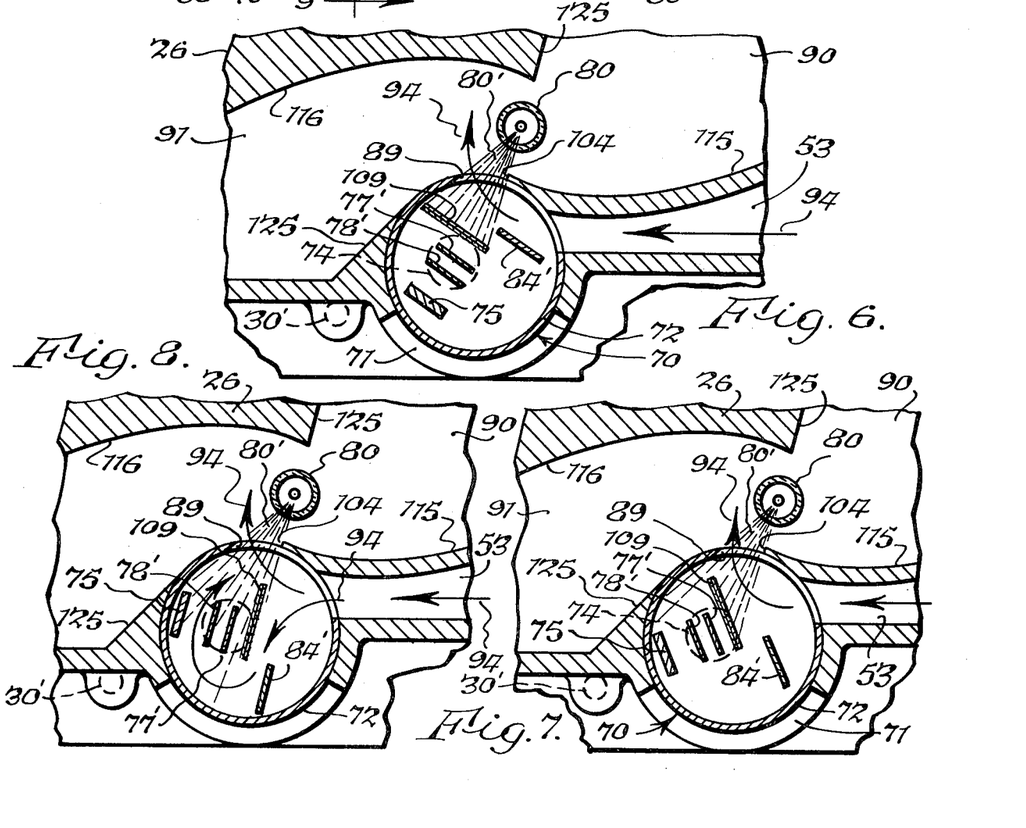
FIGS. 6, 7 and 8 are enlarged fragmentary views showing low, medium and high positions of the interrupter control.

It can be observed in FIG. 6 that the infrared radiation indicated as 80' will project through the window opening 89 and past an edge 104 of the guide system 90, 91, and in the illustration the opening is approximately 35° of radiation from generator 80. Also the radiation sensing element 109 is observed as being at 90° to centerline of this 35° of radiation. The element 109 is receiving all of the radiation coming through the window 89 from the generating lamp 80. The thermal radiation sensing part 109 is in this illustration a bi-metallic strip which has a roughened surface, blackened for greatest absorption of the infrared radiation 80'.

At this time also it should be observed in FIG. 6 that the cooling air 94 is being deflected away from the sensor element 109 by air deflector 84' and out of the window 89 toward the generator 80 to cool it. In this position the sensor 109 is close to the wall of the tube 72 at its left side preventing a back flow from behind the sensor element 109 while the deflector 84' is in its most effective deflecting position to guard sensor 109 from cooling air 94. This positioning of the parts allows for fast heating but slow cooling of the sensor 109. This condition results in the interruption of electrical current to the generator 80 sooner and for a longer off time period giving less energy output of radiation to an article for a given period of time and thus a lower final temperature. In the foregoing respect, when sensor 109 is heated, it will deflect downwardly in FIG. 11 to cause tappet 85 to move contact 78 away from contact 77 by deflecting arm 78' downwardly. In other words, high energy absorption by sensor 109 will maintain contacts 78 and 77 open for longer periods of time.

As seen in FIG. 7 the regulator arm 101 has been rotated clockwise to rotate the frame 75, the sensor 109, the contact members 77, 78 and deflector 84' to the position shown where only about 25° of the radiation 80' strikes the sensor element 109 obliquely rather than directly as in FIG. 6, thus allowing less absorption of thermal radiation and hence slower heating. Also cooling air impingement is more effective in the cooling of the sensor element 109 because it is more directly in the path of air flow than in FIG. 6. All of the foregoing produces slower heating and faster cooling of element 109, thus giving a longer cycle of energy output by the generator 80 because the contacts 77, 78 are closed longer and open for a shorter period of time than in the position of FIG. 6.

FIG. 8 shows a position of further clockwise rotation for the highest heat transmission from generator 80. In this position the sensor 109 is exposed edgewise to the radiation 80' while it has maximum cooling exposure to the cooling air 94. Note in FIG. 8 how impingement of cooling air 94 is at a little more than 90° and air deflector 84' closes against the bottom of wall 72 to cause all air 94 to engage the sensor 109 to surround it in fast turbulent cooling manner, thus giving the greatest thermal output from generator 80, with the contacts 77, 78 closed the longest and open the shortest period of time as compared to FIGS. 6 and 7. Thus by rotating tube 72 to various positions, the cycle of energy transmission from generator 80 can be controlled.

Figure 12:
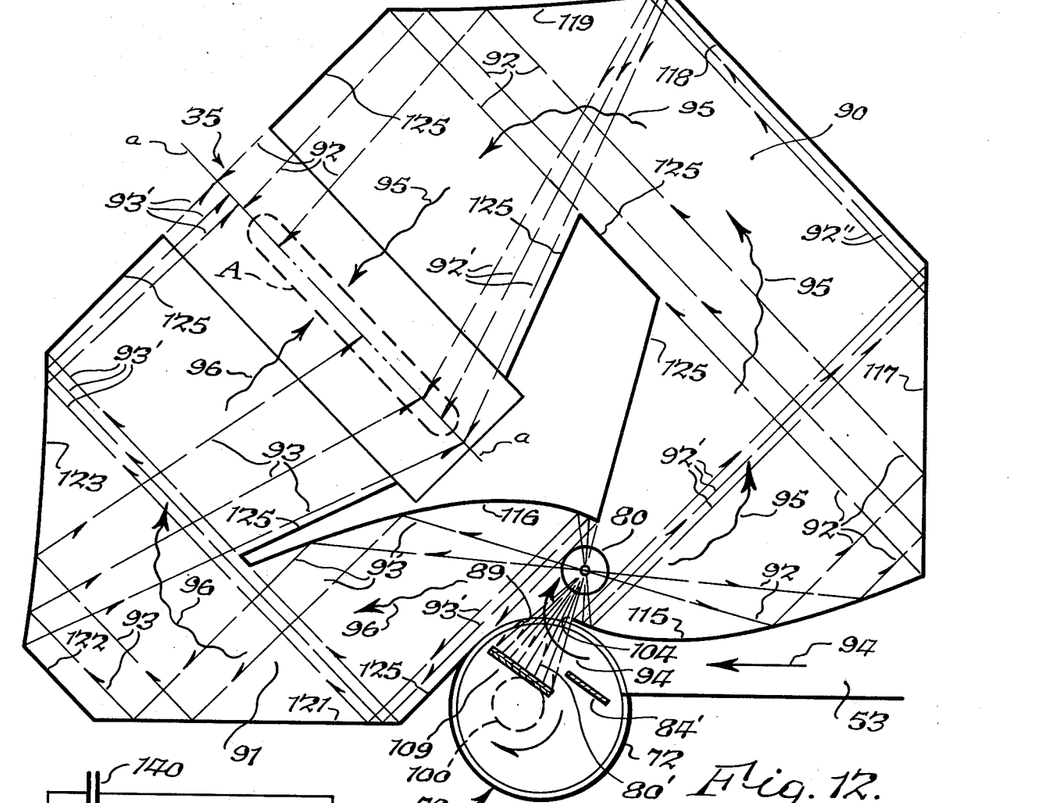
FIG. 12 is a diagrammatic view of the radiation guide system showing the split parabolic reflectors and other reflectors used.

The energy radiated from generator 80 is used primarily for heating the thermoplastic article to be softened. In this respect, since radiation from the generator 80 is radial and takes place 360° around its cylindrical quartz body, and since we are using only about 35° for actuating the control device 70 we still have about 325° to be projected to heat the article. Even so, the 35° of radiation is not lost since its heat is used to heat the air flow depicted by arrows 94. As seen in FIGS. 5 and 12, about one-half of the 325° of radiation, or 162½°, is projected to the right of generator 80 and a portion of this is projected upon a parabolic reflector 115 while the other 162½° is projected to the left of generator 80 and a portion of this is projected upon another parabolic reflector 116.

The radiation guide system 90 comprises a planar first reflector 117 set at approximately 45° to the projected rays from the parabolic reflector 115, a second curved reflector 119 set at 90° to the first reflector 117 and a third planar reflector 118. Similarly the guide system 91 comprises a planar first inverted reflector 121 set at approximately 45° to the projected rays from the inverted parabolic reflector 116, a second inverted curved reflector 123 and a third inverted planar reflector 122. Reflectors 119 and 123 are convex to spread the rays out as they approach article A. The other surfaces 125 of the systems may have reflective finishes but are not the main transmission guides and in some cases it might be found useful to make them non-reflective to cut down on sporadic reflections into the operator's eyes.

At this point it is to be noted that the filament of lamp 80 is at the focal point of parabolic reflectors 115 and 116, and therefore the reflection from these surfaces will be along parallel lines such as 92, 92' and 93, 93', as shown in FIG. 12, which is a diagrammatic representation of the optics in the guide systems 90, 91 and the air flow through these systems.

An article A which is being heated is shown in dotted lines in the channel 35. As will be seen in FIG. 12, cooling air 94 enters the interrupter control 70 and is deflected by the deflector 84', depending upon its positioning, is circulated toward or away from sensor element 109, is then directed toward the generator lamp 80 through the window 89, cools the generator 80, becomes heated by this action, and then divides into two streams indicated by the arrows 95 and 96, flows out through the channels provided by the various reflectors and housing portion 125 and then into the channel 35 where the heated air flowing in directions of arrows 95 and 96 impinges upon the surfaces of the article A to heat it. Simultaneously infrared radiation is emitted from generator 80. A portion 80' of the radiation projects through the window 89 onto the sensor 109 while the remainder of the radiation projects in two sets of rays 92, 92' and 93, 93' through the guide system 90, 91 to the channel 35 where the rays impinge upon and into the opposite surfaces of the article A.

It should be noted here that the centerline *a—a* in FIG. 12 is shown as the line of demarcation where all opposed rays 92, 92', 93, 93' meet as well, as where opposed air flows 95, 96 meet. Separation of the ray lines 92, 92' and 93, 93' varies and represents the distribution of energy with 10° radial separation flowing from the generator lamp 80. As can be seen it is not uniform along line *a—a*. In this respect, the rays 92 and 93 are spaced farther apart than the rays 92' and 93', respectively. This is a normal condition when any parabolic reflector such as 115 is used because in getting radial rays into parallel alignment the distribution suffers. Since here we are working within close limits of temperature we cannot tolerate such a gradient condition to exist to damage article A with hot spots.

To equalize this inequality the opposite inverted parabolic reflector 116 is placed on the opposite side of the generator 80 from the parabolic reflector 115, thereby inverting the image of rays 92, 92' from those of 93, 93'. As can be compared along line a—a, where the rays 93' are close together, the rays 92 are far apart, and as can also be observed further, where the rays 93 are far apart, the rays 92' are close together. Thus, equal energy distribution to all areas of the article A is accomplished and through internal conduction inside of article A, uniform heating of article A can be expected.

The control 70 produces a pulsating on-off flow of radiation. Since the emission travels at the speed of light and the filament generator is of small mass, heating takes place very quickly with small thermal inertia to slow it down. The sensor element 109 is also of small mass and it also responds rapidly. Also since the high temperature of the generator 80 is reached in approximately 5 seconds, and cooling takes place just about as fast, the generator in fluctuating from "off" temperature to "on" temperature delivers radiation of a large range of frequencies and wave lengths because different wave lengths are emitted at different temperatures. Thus surface heating as well as penetrating internal heating takes place with the article A because different wave lengths penetrate different amounts. In addition there is the added advantage of convection heating of the hot air, which in combination with the radiation makes for a very fast and efficient heater for the intended use set forth.

Figures 13, 14:
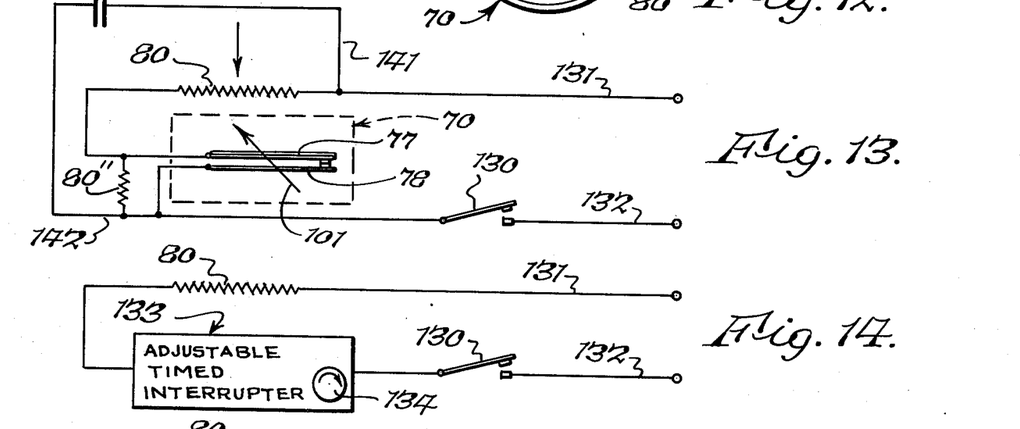
FIG. 13 is an electrical diagram of the circuitry used in the form of the invention shown in FIGS. 1 through 12.
FIG. 14 is another electrical diagram showing modified interrupter circuitry that may be used.

A circuit diagram is shown in FIG. 13 for providing the above-described pulsating on-off action. In this respect, current from a suitable source is supplied by the lines 131, 132 in series through a turn on switch 130, generator lamp 80 and the contacts 77-78 of control device 70. Thus, whenever contacts 77, 78 open and close in the above-described manner, generator 80 will be turned on and off to provide different amounts of radiant energy of different wave lengths. A condensor 140, which is connected by lines 141, 142 across the lamp 80 and control 70 to the line 131 and the turn on switch 130, may be used to even out the input surges of current to the filament of the generator 80, from the lines 131, 132, as shown in FIG. 13. In some cases to further reduce heavy input surges of current into a cold generator filament 80, it might be found desirable to place a low current passing resistance 80" across the contacts 77, 78. Thus, when these contacts are open, a small current will flow through the resistance 80" into generator filament 80 to keep it warmed at a higher resistance and thus there will be less current surge when the contacts are closed across the lines 131, 132. Although resistance 80" is shown in FIG. 13, it can be eliminated if desired because the generator 80 will operate without it.

An alternate type of control is shown in FIG. 14 where an adjustably variable timed interrupter is varied by an adjuster 134 and is placed in series with the generator 80 similar to that in FIG. 13. In this embodiment, the pulsating on-off action is controlled by interrupter 133 and a control like 70 of FIG. 12 is not needed.

Figure 15:
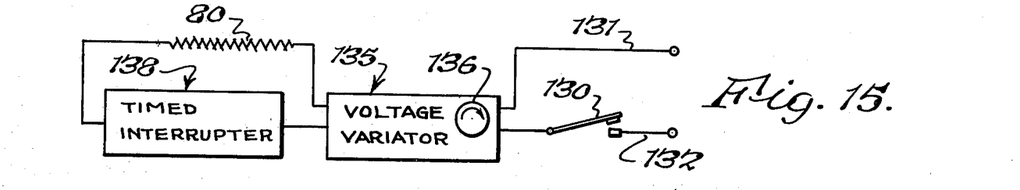
FIG. 15 is still another modified circuit of control that could be used.

Still another control is shown in FIG. 15 using a variable voltage-producing device 135 having an adjustment control 136 to vary the voltage from the lines 131, 132 to the generator 80, with a timed interrupter 138 in series. Other electronically operated equipment to provide pulsating current for control of generator 80 might also be used.

All of the controls of FIGS. 13, 14 and 15 are capable of producing on-off periods of varying duration to vary the amount of heat supplied to article A and also are capable of producing long and short infrared wave lengths because of the variation in the temperature of generator 80 during the on-off periods.

DETAILED DESCRIPTION OF MODIFICATION

In the modified construction of the invention now to be described, much of the foregoing construction and parts are the same and similar part numbers are used.

Mainly this modified construction would be used where hot air convection heating is desired or necessary and yet where it is desired to take advantage of the quick heating and efficiency of the previously described form. Therefore a thermal converter 210 is used which converts most of the radiant heat into hot air which is then used to heat the article by convection.

A housing 25' similar to the housing 25 is comprised of mating sections 26", 27", 28', 29' suitably held together with screws 30'.

Figure 20:
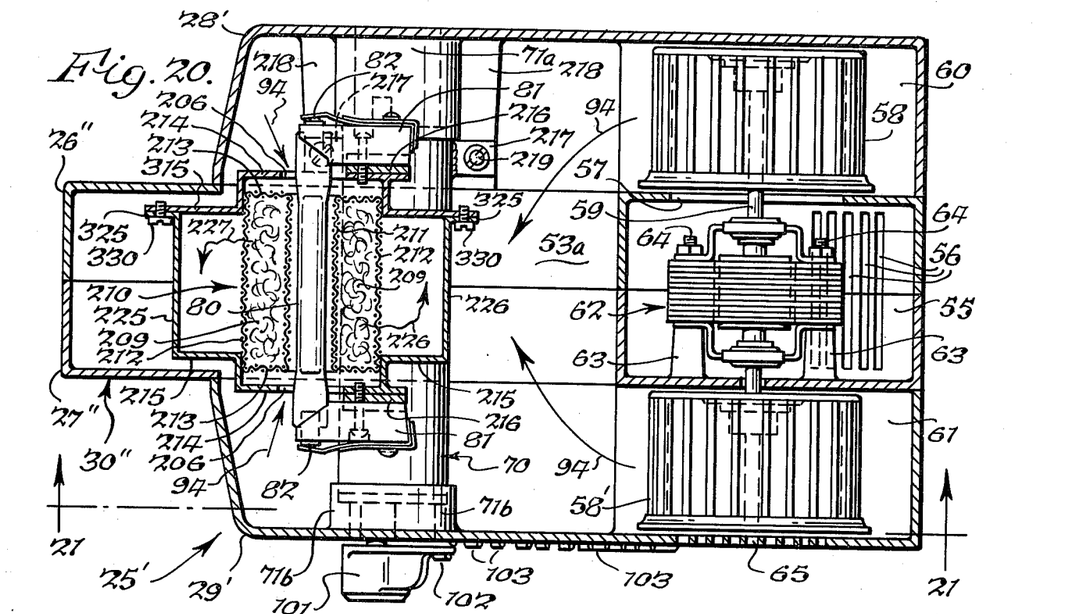
FIG. 20 is a horizontal sectional view along line 20—20 of FIG. 16, showing forced air motivating means, the radiant generator and the thermal conversion unit surrounding it.

As shown in FIG. 20 a motor compartment 55 contains a blower motor 62 mounted on bosses 63 of the closure 27" by screws 64. An intake grid 56 and air inlet 57 is provided to a blower wheel 58 in a blower housing 60. On its other end the extended shaft 59 of the motor carries another blower wheel 58' operating in another blower housing 61 of the closure 29' and has an intake grid 65. Both blowers deliver air into an air chamber 53a which is encompassed by all of the enclosures 26", 27", 28' and 29'.

Tubular extensions 71a and 71b support the control device 70, and a regulator arm 101 having a pointer 102 registers with calibrated markings 103 on the wall of 29'. This control device 70 is identical to that previously described and comprises identical parts such as 72, 77, 78, 84' and 109 among others. The window opening 89' is similar to opening 89 previously described, except that in this form opening 89' includes two energy guide walls 225 and 226 which are on the same side of the energy generator 80 and could be, if desired, of parabolic configuration, having their outward ends terminating at an exposure channel 35'. Integral therewith is a cylindrical converter generally indicated as 210 which consists of a small cylinder 211 surrounded by a larger cylinder 212 with a space in between and closed by end walls 213. This converter may be made of a pervious material of fabric such as stainless steel screen or equivalent. The extreme ends of the converter 210 are supported in cylindrical end caps 214 forming part of the side walls 215, 315 of the energy guides 225, 226.

This thermal converter 210 works on the principle of absorption of the energy of infrared radiation and converting it into heat whereupon through convection it is transferred to a flow of air passing through the converter and then through convection again to the article to be heated.

To accomplish this result, the space between the walls 211, 212 and ends 213 of the converter 210 are packed with a material 209 such as a dark colored metallic wool or other foraminous material which is a good absorber of infrared. This material or its equivalent is opaque to the rays of infrared radiation and yet is permeable to the flow of air 94, which freely flows through it and by convection is heated to it.

Figure 16:
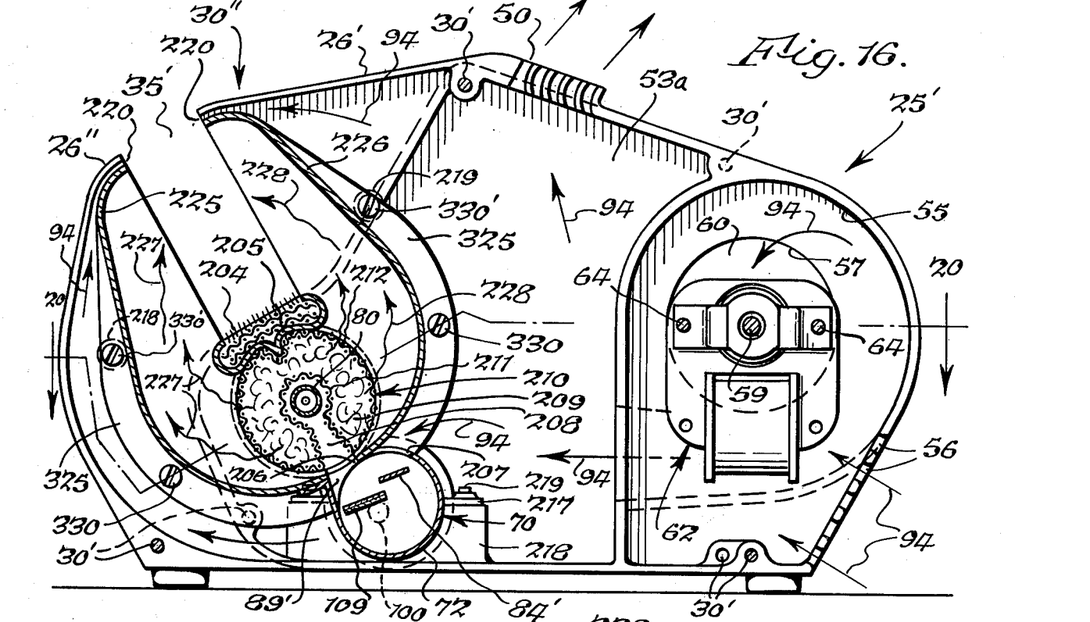
FIG. 16 is a central sectional view, similar to that in FIG. 5 but of a modified form of the invention, showing a thermal convection conversion unit surrounding the radiant heat generator.
Figure 17:
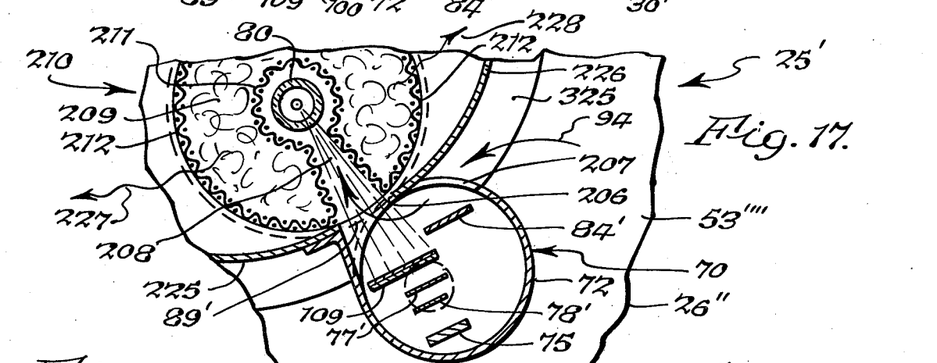
FIGS. 17, 18 and 19 are fragmentary enlargements of the interrupter control with the conversion unit showing low, medium and high control positions.
Figures 18, 19:
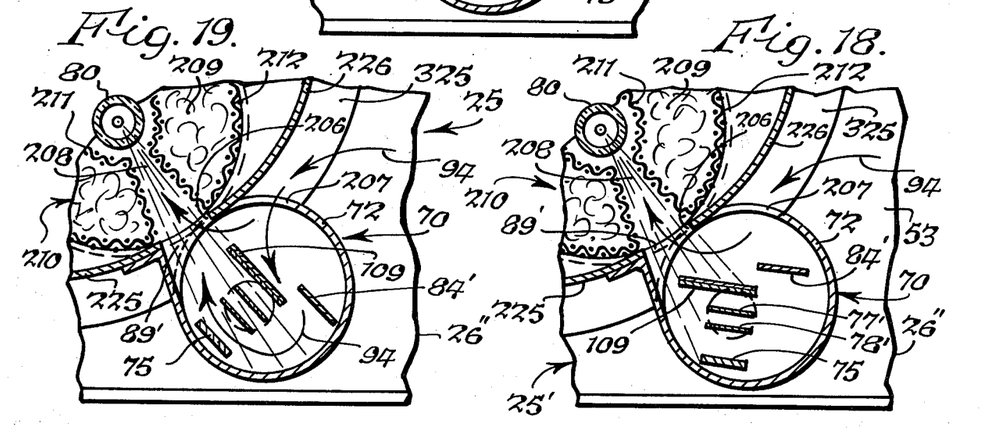

As can readily be seen in FIG. 16, air 94 from the air chamber 53a at above ambient atmospheric pressure flows into the portion 207 of the window 89' and up past the limiting edge 206 of guide wall 226 into a throat 208 formed into the converter 210 where it cools the generator lamp tube 80 and passes through the metal fabric 211 and into the metallic wool packing 209 where it absorbs heat from the packing 209 through convection and then passes out through the metal fabric 212 and divides into two streams of hot air 227, 228. Directed by the guides 225, 226, the hot air then is brought into contact with the sides of the article held in the channel 35' where through convection the article is heated.

By using a very dense packing 209 most of the infrared radiation would be converted into heated air and that not converted would be directed through the energy guides 225, 226 to the walls of the article in the channel 35'. Therefore one could alter the ratio of heated air to radiation by selecting a density of packing 209 to give the ratio desired.

End caps 214 as seen in FIG. 20 have socket mounts 216 which carry sockets 81 which in turn precisely mount the infrared generator 80, which is identical to that in the first form of the invention.

At the upper end in FIG. 20 the control device 70 which supports and holds the converter 210 just described has a pair of support arms 217 which spread to either side of the device 70 and are rigidly held on to an embossment 218 in the closure part 28' by screws 219. Energy guides 225, 226 may be fixed to the tubular body 72 of the control device 70 in any suitable manner with the end wall 215 also made integral therewith. The other end wall 315 is fastened to the guides 225, 226 by means of the flange 325 and screws 330.

Figures 21, 22:
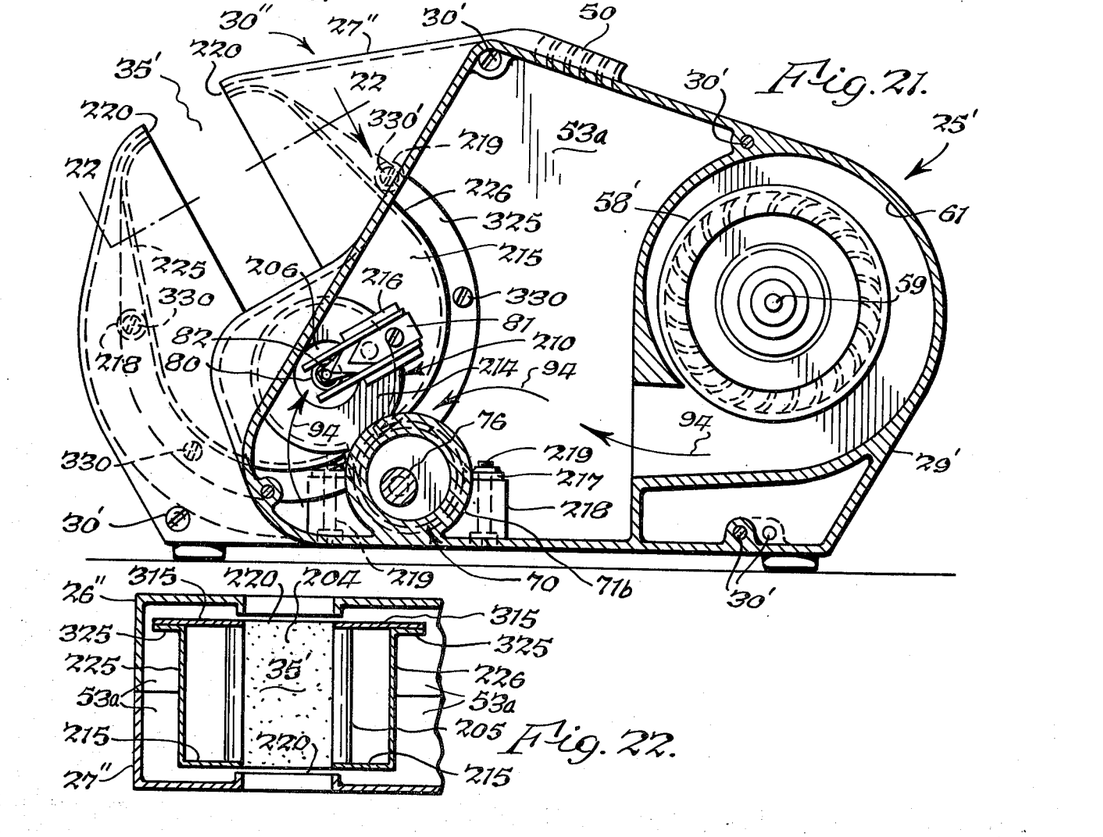
FIG. 21 is a vertical longitudinal section along line 21—21 of FIG. 20.
FIG. 22 is a fragmentary section along line 22—22 of FIG. 21 showing the heating channel and energy guide system.

As seen in FIGS. 16 and 21 bosses 218 projecting from closure 28' may also be provided to give further support to the energy guides. At these two places 218, the screws 219 would screw into the bosses 218. As will be observed, all of the walls 225, 226, 215, 214, 315 are spaced from the housing 25' walls so that ambient temperature air 94 can freely pass and carry away lost heat to keep the housing 25' comfortable to the touch.

Air spaces 220 prevent contact of hot metal to the walls 26" and 27" and allow ambient air to pass out between them from chamber 53a.

Openings 206 in the end caps 214 allow pressurized air 94 to flow past the sockets and contacts 81, 82 to keep them cool and also around the ends of the generator tube 80 and into converter 210.

The channel 35' has a bottom 205 which divides the two air streams 227, 228 and may be carpeted with a soft fiberglass plush cushion 204 for non-marring engagement, if an article would be placed that deeply in the channel 35'.

A modified form of control device 370 is shown in FIGS. 23-28. In this embodiment an extremely thin, low mass, monometallic heat responsive sensor element 309 is used, instead of the bimetallic element 109 previously described. Element 309 expands and contracts in a lineal direction to open and close the contacts 377 and 378 which are in series with the generator 80. The general structure of control 370 is similar to the control 70 and many parts are identified by the same numerals previously used for analogous parts.

Figure 23:
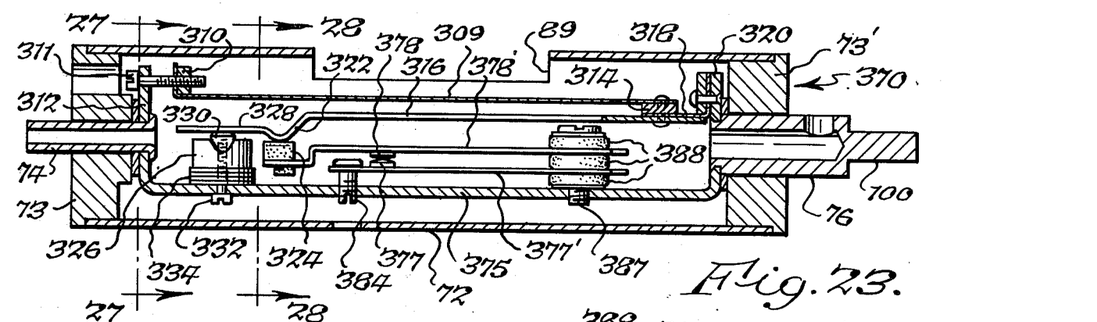
FIG. 23 is a cross sectional view taken substantially on line 23—23 of FIG. 24 and showing an improved heat responsive switch for effecting a switching action in response to changes in temperature.
Figure 24:
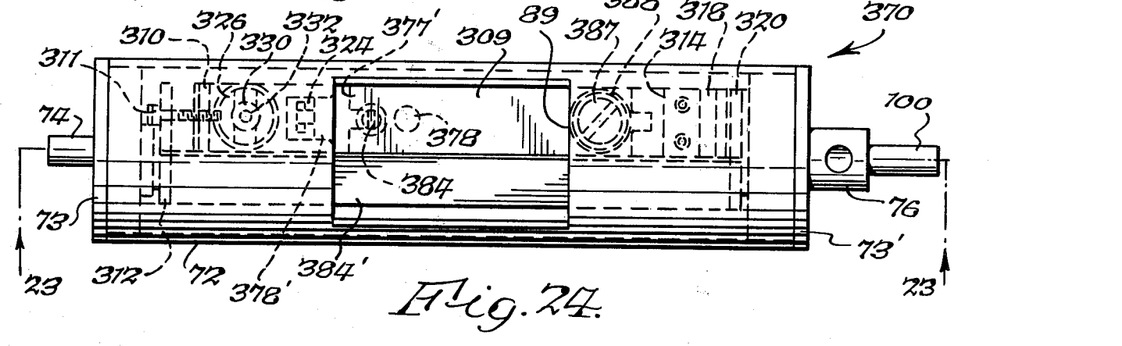
FIG. 24 is a plan view of the switch of FIG. 23.
Figure 25:
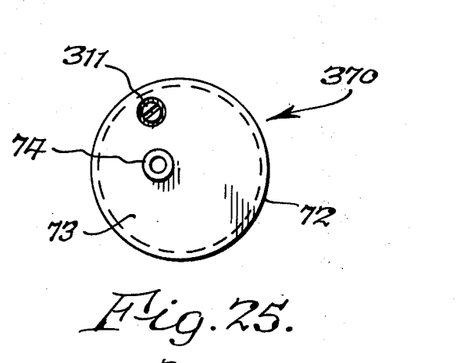
FIG. 25 is an end elevational view taken from the left of FIG. 24.
Figure 26:
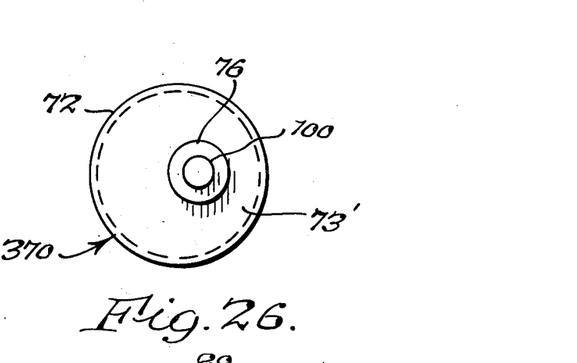
FIG. 26 is an end elevational view taken from the right of FIG. 24.
Figure 27:
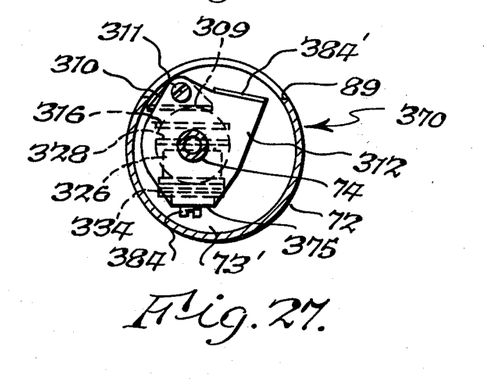
FIG. 27 is a cross sectional view taken substantially along line 27—27 of FIG. 23.
Figure 28:
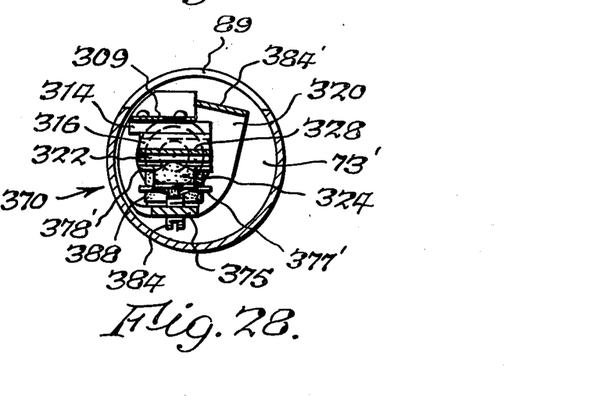
FIG. 28 is a cross sectional view taken substantially along line 28—28 of FIG. 23.

The single thin metal sensor element 309 shown in FIG. 23 has a roughened black surface on its upper side for exposure and absorption of infrared rays entering the window 89. Its left end terminates in an end piece 310 into which a tension adjusting screw 311 is threaded. The head of screw 311 bears against the left end 312 of frame member 375. The right end of sensor 309 is fastened to a lever arm 314 which is fastened to an actuating arm 316 and a spring hinge 318, the latter being suitably affixed to the right end 320 of frame member 375.

Tension applied through the screw 311 pulls the sensor strip 309 and lever arm 314 to the left. Because the lever arm 314 is above the hinge spring 318, it will rotate the arm 316, which is fastened to both sensor 309 and hinge spring 318, downwardly (counterclockwise) where its formed portion 322 bears downwardly against a ceramic button 324 on the end of an upwardly biased spring finger 378' which bears against the arm 316. This downward movement causes contact 378 to engage contact 377 on upwardly biased spring finger 377' and close the circuit to the generator 80. The fingers or arms 377' and 378' are mounted on frame 375 through a screw stud 387 and insulators 388. A headed nylon or fiber non-conductive screw 384 adjusts the position of finger 377' which is biased upwardly toward finger 378'.

A permanent magnet 326 attracts the head end 328 of the actuating arm 316 to cause a quick make and break of the contacts 377, 378. Magnet 326 is fastened in place on frame 375 by a brass screw 332 and nut 330, the nonmagnetic nut 330 forming a stop for the head end 328. Shim washers 334 are used for adjusting of magnet 326 toward or away from head 328.

In operation, the extremely thin, low mass of sensor 309 gives a very low inertial heat lag for both quick heating and quick cooling and thus very accurate response, with less overshoot of the on and off periods. The parts as shown in FIG. 23 are in their cold position, with the contacts 377 and 378 closed and the head 328 stopped against nut 330 and attracted very strongly by magnet 326. Upon infrared heat entering the window 89, sensor 309 quickly heats up and expands, relaxing the downward pressure on actuating arm 316. When the upward force of spring arm 378' becomes greater than the attraction the magnet 326 has, for the head 328 of arm 316, the arm 316 and finger 378' suddenly move upwardly and break the circuit between contacts 377, 378 and the generator 80 and its current supply. Upon cooling, the sensor 309 contracts to swing actuator arm 316 downwardly against the upward thrust of arm 378' until magnetic attraction again suddenly moves head 328 down against nut 330 at the same time moving arm 378' down and closing contact 378 against 377. An air deflector 384' fastened to frame 375 and similar to deflector 84' is also used in this form of control.

Variable exposure to the rays 80' through window by rotation of the assembly is the same as in the previous description and will not be repeated.

From the preceding descriptions and explanations it can be seen that the apparatus has capabilities of extremely fast heating and cooling of thermoplastic articles such as ophthalmic frames in the custom fitting of patients and in other similar work on thermoplastic articles. In addition, it can be seen that an improved heat responsive switch has been provided which is extremely sensitive to changes in temperature and is extremely reliable in operation.

The terms and expressions which have been employed are used as terms of description and not of limitation and there is no intention, in the use of such terms and expressions, of excluding an equivalents of features shown and described, or portions thereof, it being recognized that various modifications are possible within the scope of the invention claimed.

What is claimed is:

1. A device for heating an article, comprising a housing, article receiving means positioned relative to said housing for positioning an article to be heated in said housing, infrared generator means in said housing providing a source of infrared heating energy and guide means in said housing for conducting said heating energy to said receiving means, said guide means dividing said housing into a heating chamber in which the article to be heated is positioned by said receiving means and an interior chamber, said generator means being located in said heating chamber, said housing having means including air moving means to pressurize said interior chamber, said guide means having a window at said generator means opening into said interior chamber to allow a flow of air through said window from said interior chamber into said heating chamber toward said generator means and to said article receiving means, said interior chamber at said window including a radiant energy responsive thermal control connected in controlling relationship with said infrared generator means and arranged to vary the energy output of said generator means in response to absorption of radiant heat from said generator means through said window and loss of said heat through said air flow through said window past said thermal control.

2. A device as set forth in claim 1 wherein said control means includes means for varying the voltage across said infrared generator means.

3. A device as set forth in claim 1 wherein said infrared generator means comprises a lamp and wherein said guide means comprise reflector means for directing radiant energy from said lamp to a plurality of sides of said article.

4. A device as set forth in claim 1 including means connected to said generator means for cycling said energy output on and off.

5. A device as set forth in claim 4 wherein said control means include means for varying the duration of said on period and said off period.

6. A device as set forth in claim 4 wherein said means for cycling includes interrupter means.

7. A device as set forth in claim 1 wherein said generator means is partially surrounded by a thermal converter which allows some of the direct radiation of said generator means to filter through it to said guide means for conduction to said article and interrupts and absorbs the rest of the radiation converting it to heat, which through convection then heats said flow of air flowing through said window in said guide means and to said article.

8. A device as set forth in claim 7 wherein said thermal converter comprises a foraminous container provided with an opening matching said window, the interior of said container being filled with fibrillar infrared absorbing material, said air flow through said window flowing into the interior of said container through said opening and being heated by contact with said fibrillar material before flowing out of said foraminous container.

9. A device as set forth in claim 7 wherein said thermal converter comprises a perforate container provided with an opening at said window, the interior of said container containing a foraminous infrared absorbing material, said air flow through said window flowing into the interior of said container through said opening and being heated by contact with said foraminous material before flowing out of said perforate container.

10. A device for heating an article, comprising a housing, article receiving means positioned relative to said housing for positioning an article to be heated in said housing, infrared generator means in said housing providing a source of infrared heating energy and guide means in said housing for conducting said heating energy to said receiving means, said guide means dividing said housing into a heating chamber in which the article to be heated is positioned by said receiving means and an interior chamber, said generator means being located in said heating chamber, said housing having means including air moving means to pressurize said interior chamber, said guide means having a window at said generator means opening into said interior chamber to allow a flow of air through said window from said interior chamber into said heating chamber toward said generator means and to said article receiving means, said interior chamber at said window including a radiant energy responsive thermal control connected in controlling relationship with said infrared generator means and arranged to vary the energy output of said generator means, said thermal control being exposed to radiation from said generator means through said window and to said air flowing through said window, said thermal control including means for varying the orientation of said thermal control relative to said window to allow for more response or less response by allowing said control more exposure to radiation and less exposure to cooling by said air and, alternatively, for less exposure to radiation and more exposure to cooling by said air, to thereby vary the on periods of said generator means relative to the off periods.

11. A device as set forth in claim 10 wherein said thermal control includes an air deflector which is positioned on said control arranged to intensify the exposure to radiation in one orientation of said control and to intensify the exposure of the thermal control to cooling in another orientation thereof.

12. A device as set forth in claim 10 wherein said thermal control is supported in a mounting provided with a regulator arm for selective manipulation to a selected thermal control orientation relative to said window.

13. A device as set forth in claim 10 wherein said thermal responsive control includes an element as a sensor.

14. A device as set forth in claim 10 wherein said thermal responsive control includes a sensor which is a monometallic expansive and contractive element.

15. A device for heating an article comprising a housing, article receiving means positioned relative to said housing for receiving said article, infrared generator means in said housing providing a source of radiant energy, guide means in said housing for conducting said heating energy to said article receiving means, said guide means comprising a split out of phase parabolic reflector having a first half as one part of said guide means and an inverted second half as another part of said guide means, said first half directing parallel rays of said radiant energy to a first reflector set at approximately 45° to the direction of said rays, said first reflector directing parallel rays to a second reflector set at approximately 90° to said first reflector to direct said rays into said article receiving means to one side of said article, said inverted second half directing parallel rays of said radiant energy to a first inverted reflector set at approximately 45° to the direction of said rays, said first inverted reflector directing parallel rays to a second inverted reflector, set at approximately 90° to said first inverted reflector, to direct said rays into said article receiving means to another side of said article, whereby said parallel rays received by said article receiving means on one side are transposed to that received by another side, included in each of said one part and said another inverted part of said guide means is a third reflector located between said first and second reflectors of said one part and said first and second inverted reflectors of said another inverted part to direct radial as well as parallel rays of radiant energy directly from said generator means to both sides of said article receiving means.

16. A device as set forth in claim 15 wherein at least one of said second reflector and second inverted reflector are convex to spread said radiant energy over a larger area in said article receiving means.

* * * * *